Patented Nov. 20, 1923.

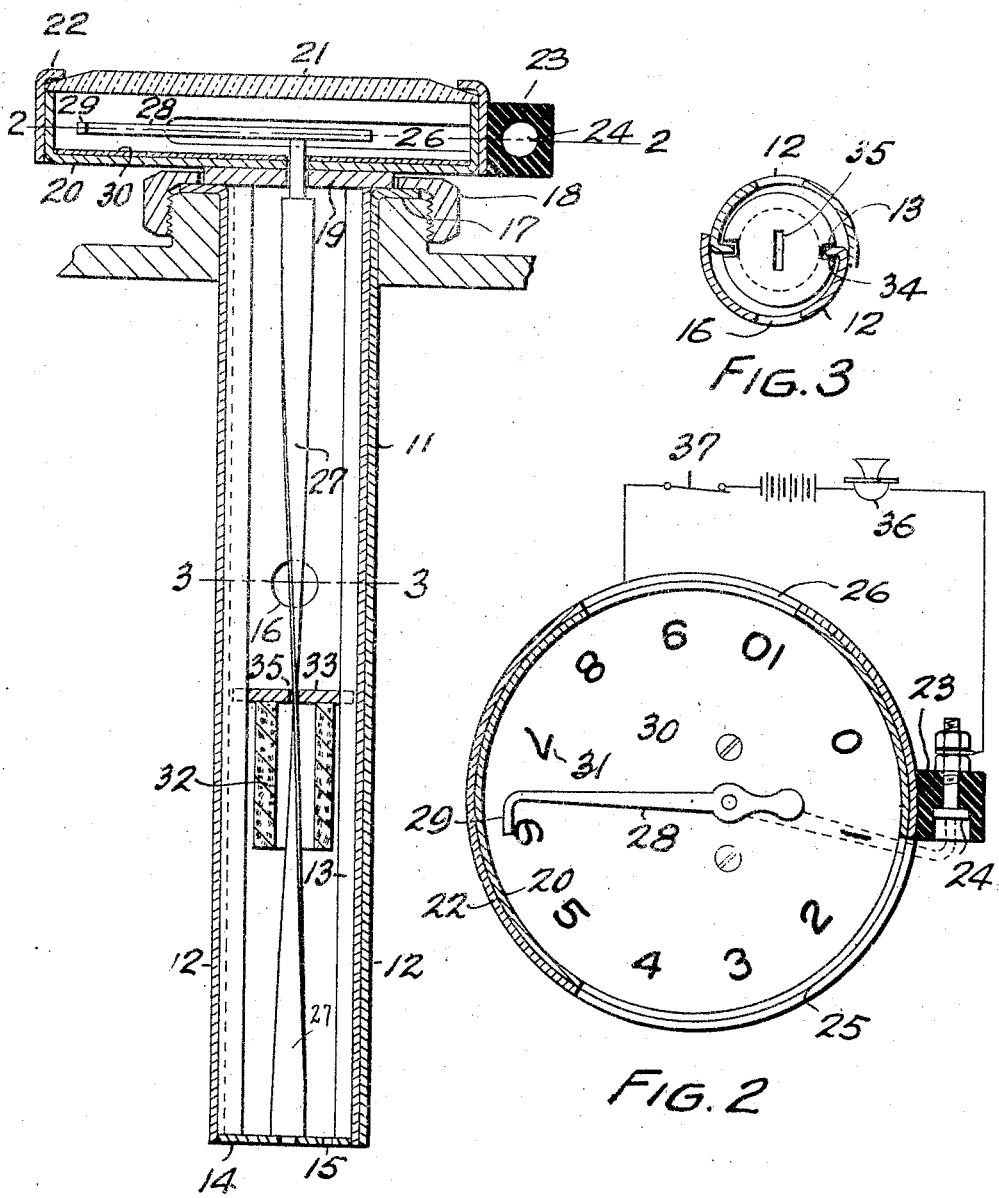

1,475,087

UNITED STATES PATENT OFFICE.

SOLOMON A. SHAPIRO, OF MONTREAL, QUEBEC, CANADA.

FLOAT-OPERATED SWITCH.

Application filed July 15, 1921. Serial No. 485,074.

*To all whom it may concern:*

Be it known that I, SOLOMON A. SHAPIRO, a subject of the King of Great Britain, and resident of the city of Montreal, in the Province of Quebec and Dominion of Canada, have invented certain new and useful Improvements in Float-Operated Switches, of which the following is a full, clear, and exact description.

This invention relates to improvements in liquid level gauges, and the object of the invention is to provide a gauge which will at all times indicate the amount of liquid in a tank and which will also operate an alarm device when the liquid in the tank is nearly exhausted.

A further object is to provide a gauge, the operation of which will not be affected by surging of liquid in the tank.

The device consists briefly of a tube extending nearly to the bottom of the tank and containing a float vertically movable but irrevoluble therein. The float is operatively connected with a screw carrying an indicating hand. An alarm circuit is arranged to be closed by the device when the level of the liquid drops to a predetermined point.

In the drawings which illustrate the invention:—

Fig. 1 is a vertical sectional view of the device.

Fig. 2 is a view in section on the line 2—2, Figure 1.

Fig. 3 is a cross section on the line 3—3, Figure 1.

Referring more particularly to the drawings, 11 designates a tubular float chamber adapted to be vertically disposed in a tank and preferably formed of two substantially semi-circular parts 12 each provided at one edge with an inwardly projecting flange 13. These parts are secured together in any suitable way with the unflanged edge of one part overlapping the flanged edge of the other part, so as to form a substantially cylindrical chamber having diametrically opposite, inwardly projecting flanges or ribs extending from top to bottom thereof, as shown in Figures 1 and 3. The lower end of the chamber is provided with a bottom 14 having a small opening 15 for the entrance of liquid. Intermediate the top and bottom of the chamber, one or more comparatively large opening 16 may be provided for the entrance of liquid. The upper end of the chamber is provided with an outwardly projecting flange 17 adapted for attachment to the neck of a tank by means of an internally threaded flanged nut 18. The top of the chamber is closed by a plate 19 of sufficient thickness to provide clearance between the nut 18 and a dial casing 20 secured in any suitable manner to the top 19. This dial casing is disposed eccentrically with respect to the chamber, as will be clearly seen in Figures 1 and 2. The casing is provided with a transparent top 21 retained by a bezel ring 22 which carries an externally disposed block of insulating material 23 containing one terminal 24 of an electric circuit, this terminal being sunk below the outer surface of the block, as clearly shown in Figure 2. The dial casing and bezel ring are slotted on each side of the block 23 at the level of the terminal 24, as shown at 25 and 26, the terminal being located at that point of the circumference nearest the axis of the chamber 11.

An operating screw 27 is disposed axially in the chamber and comprises a flat strip or bar of sufficient stiffness twisted about its axis through approximately 360°, thus providing for a single turn in the length of the screw. The upper end of the screw is cylindrically formed and is journalled in the top of the chamber and bottom of the dial casing, through which it projects a sufficient distance to carry an indicating needle 28, the point of which is hooked as at 29 to enable it to enter the block 23 and engage the terminal 24. Owing to the eccentric disposition of the dial casing and float chamber, the needle in swinging through its arc of travel will enter the slots 25 and 26, so that its hooked end will pass outside the casing for the purpose of engaging the externally disposed terminal. A dial 30 is located in the casing 20 and is inscribed with characters 31 indicating the capacity of the tank in gallons, cubic feet, inches of level, or any other unit of measurement. This dial is so disposed that the needle will engage the terminal at the same time that it indicates on the dial a nearly complete exhaustion of liquid. For example, in a tank of ten gallons capacity, the needle may engage the terminal when indicating one gallon in the tank as shown in Figure 2.

The screw is operated by means of a float 32 of cork or other suitable material centrally apertured to permit rotation of the screw therethrough. The upper end of this float carries a disc 33 of metal notched at diametrically opposite points 34 to engage the flanges 13, so as to hold the float against rotation in the chamber. The disc is also provided with a centrally disposed elongated slot 35 for the passage of the screw. This slot forms an operative connection between the float and screw by means of which the screw is rotated on the rise or fall of the float.

As the float rises or falls in the tank by reason of change in the liquid level, it rotates the screw to position the needle 28 and indicates on the dial the amount of liquid in the tank. As the liquid level falls and the needle swings toward zero, it passes, owing to its eccentric disposition in the casing, through the slot 25 and finally, when only a predetermined amount of liquid remains, the needle engages the terminal 24 to which one side of an electric circuit is connected, the other side being grounded on the gauge or on any metal parts electrically connected to it. According to the present invention, this circuit includes an audible alarm device 36, which in the case of an automobile or motor boat may be a special device or the electric horn generally used. A signal thus given will persist until the operator either replenishes the tank or opens the circuit at a special switch 37. When the tank is filled the liquid will rise quite slowly in the chamber by reason of the small aperture 15 but, when the tank is partly full, the large openings 16 will be submerged and liquid will run into the chamber quite rapidly, so that the float will rise at the same rate as the liquid. When the liquid is exhausted below the level of the openings 16, the small bottom opening 15 will so check the in or out flow of liquid that the liquid level in the chamber will not be materially affected by surging of liquid in the tank and in this way the alarm will not be sounded prematurely, as might readily happen when the true level approached the alarm point if the liquid could rise and fall rapidly in the chamber. The disposition of the terminal outside the dial casing precludes the possibility of any spark in the terminal igniting gas which might have found its way into the casing and thereby creating an explosion.

While the foregoing description and the drawings illustrate the preferred embodiment of my invention, it will be understood that the invention is not limited to detail of construction therein described and illustrated but includes all minor modification and mechanical equivalents.

Having thus described my invention what I claim is;—

1. In a gauge, a dial casing, a graduated dial therein a needle mounted eccentrically of said casing and oscillatable therein to cooperate with the dial, the casing being apertured in its circumference for the egress and ingress of said needle, and an electric contact disposed externally of the casing in position to be engaged by said needle on the egress thereof from the casing.

2. In a gauge, a dial casing, an electrical contact eccentrically mounted in said casing and movable therein, said casing being apertured for the egress and ingress of said contact, a lateral projection on the end of the contact an insulator disposed exteriorly of the casing provided with a pocket for receiving the said lateral projection and a second electric contact secured within said pocket in position to be engaged by the movable contact on the egress of the latter from the casing.

In witness whereof, I have hereunto set my hand.

SOLOMON A. SHAPIRO.